United States Patent
Hikazudani et al.

(10) Patent No.: US 8,722,011 B2
(45) Date of Patent: May 13, 2014

(54) METHOD OF PRODUCING HYDROGEN FROM AMMONIA

(75) Inventors: Susumu Hikazudani, Osaka (JP); Takuma Mori, Osaka (JP); Sadao Araki, Osaka (JP)

(73) Assignee: Hitachi Zosen Corporation, Osaka-shi (JP)

( * ) Notice: Subject to any disclaimer, the term of this patent is extended or adjusted under 35 U.S.C. 154(b) by 0 days.

(21) Appl. No.: 13/822,041

(22) PCT Filed: Jul. 6, 2011

(86) PCT No.: PCT/JP2011/065460
§ 371 (c)(1),
(2), (4) Date: May 22, 2013

(87) PCT Pub. No.: WO2012/039183
PCT Pub. Date: Mar. 29, 2012

(65) Prior Publication Data
US 2013/0266506 A1 Oct. 10, 2013

(30) Foreign Application Priority Data
Sep. 21, 2010 (JP) .................. 2010-210732

(51) Int. Cl.
*H01M 8/06* (2006.01)
*B01J 7/00* (2006.01)
*C01B 3/04* (2006.01)
*F02B 43/10* (2006.01)

(52) U.S. Cl.
USPC ............. 423/658.2; 429/416; 422/634; 123/3

(58) Field of Classification Search
None
See application file for complete search history.

(56) References Cited

U.S. PATENT DOCUMENTS

| 2011/0283960 A1 | 11/2011 | Hikazudani et al. |
| 2012/0040261 A1 | 2/2012 | Nakanishi et al. |

FOREIGN PATENT DOCUMENTS

| JP | 2005-332152 A | | 12/2005 |
| JP | 2010-180075 A | | 8/2010 |
| JP | 2010-180098 A | * | 8/2010 |
| JP | 2010-180098 A | | 8/2010 |
| JP | 2010-241647 A | | 10/2010 |
| WO | WO-2010058807 A1 | | 5/2010 |
| WO | WO 2010/116874 | * | 10/2010 |

OTHER PUBLICATIONS

International Search Report dated Aug. 30, 2011, issued for PCT/JP2011/065460.

* cited by examiner

*Primary Examiner* — Melvin C Mayes
*Assistant Examiner* — Douglas Call
(74) *Attorney, Agent, or Firm* — Edwards Wildman Palmer LLP; James E. Armstrong, IV

(57) ABSTRACT

In a method by which hydrogen supplied as a combustion aid to an ammonia combustion engine is produced from ammonia, the filling amount of a decomposition catalyst in an ammonia decomposition apparatus is reduced. The method includes an ammonia decomposition apparatus that produces hydrogen as a combustion aid and an ammonia oxidation apparatus that allows a part of introduced ammonia to react with oxygen for combustion by action of an oxidation catalyst in order to supply the heat needed for the ammonia decomposition reaction, wherein the amount of ammonia and the amount of air introduced into the oxidation apparatus are controlled in accordance with the entrance temperature of an ammonia oxidation catalyst layer, so as to set the ammonia decomposition ratio in the ammonia decomposition apparatus to be 40 to 60% at all times.

1 Claim, 2 Drawing Sheets relationship between the catalyst filling amount at an entrance temperature of 200°C and the ammonia decomposition ratio relationship between the ammonia supply amount at an entrance temperature of 200°C and the ammonia decomposition ratio

METHOD OF PRODUCING HYDROGEN FROM AMMONIA

TECHNICAL FIELD

The present invention relates to a method of producing hydrogen from ammonia by which hydrogen supplied as a combustion aid to an ammonia combustion engine that uses ammonia as a fuel is produced from ammonia.

BACKGROUND ART

An ammonia combustion engine that uses ammonia as a fuel is known from the past. This ammonia combustion engine has a poor ignition property of ammonia, so that the combustion of ammonia at the time of low-load operation and at the time of high-load operation of the engine will be insufficient. Therefore, a combustion aid must be added in order to support the combustion of ammonia. As the combustion aid, a hydrocarbon fuel or hydrogen can be used. Here, ammonia is a compound made of hydrogen atoms and a nitrogen atom, so that hydrogen can be produced by chemical decomposition of ammonia. Therefore, when hydrogen produced by decomposition of ammonia is used as a combustion aid, the engine can be driven simply with ammonia alone, so that it can be considered as the most desirable system.

In order to produce hydrogen by decomposition of ammonia, for example, ammonia must be brought into contact with a ruthenium ammonia decomposition catalyst at a temperature of 400° C. or higher. This ammonia decomposition reaction is as follows.

$$2NH_3 \rightarrow N_2 + 3H_2 \qquad (1)$$

However, since this ammonia decomposition reaction is an endothermic reaction, heat must be supplied from the outside in order to obtain a stable ammonia decomposition ratio. In the case of an ammonia combustion engine automobile, engine exhaust gas is used as this heat source.

The following patent document 1 discloses an ammonia combustion engine in which the exhaust gas after combustion of ammonia in the ammonia combustion engine is supplied to ammonia decomposition reaction means. In this ammonia combustion engine, the ammonia decomposition reaction is promoted by utilizing the fact that the exhaust gas from the ammonia combustion engine has a high temperature.

PRIOR ART DOCUMENTS

Patent Documents

PATENT DOCUMENT 1: Japanese Patent Application Laid-open No. 05-332152

SUMMARY OF THE INVENTION

Problems to be Solved by the Invention

However, in this apparatus disclosed in the patent document 1, the temperature of the ammonia decomposition catalyst depends on the temperature of the exhaust gas of the ammonia combustion engine, so that the ammonia combustion efficiency in the ammonia combustion engine is poor at the low-load operation time (engine starting time). For this reason, the exhaust gas having a high temperature is not supplied to the ammonia decomposition catalyst, and therefore, the progression property of the reaction that generates hydrogen and nitrogen from ammonia is poor. As a result thereof, hydrogen that serves as a combustion aid for promoting the driving of the engine is not supplied to the ammonia combustion engine in a low-load operation state, thereby raising a problem in that a long period of time is needed in order for the ammonia combustion engine to escape from the low-load operation state.

Also, the catalyst performance of the ammonia decomposition catalyst is affected by the partial pressures of ammonia and hydrogen. The higher the partial pressure of ammonia is, the better the catalyst performance will be. Conversely, the higher the partial pressure of hydrogen is, the poorer the catalyst performance will be. In other words, in the vicinity of the ammonia decomposition catalyst layer entrance, ammonia is present at a high concentration, so that a high catalyst performance is exhibited. However, in the vicinity of the catalyst layer exit, almost all of the ammonia is decomposed and the hydrogen concentration is high, so that a low catalyst performance is exhibited. In this manner, in order to obtain a decomposition ratio of 100%, because a region in which the ammonia concentration is extremely low and the hydrogen concentration is high is necessarily present, ammonia must be decomposed also in this region, so that the catalyst filling amount becomes extremely large, thereby raising a problem of increase in the hydrogen production cost.

An object of the present invention is to solve the aforementioned problems of the prior art and to provide a method of producing hydrogen from ammonia by which the filling amount of the ammonia decomposition catalyst in the ammonia decomposition apparatus can be reduced; the efficiency of producing hydrogen can be maintained; the cost of producing hydrogen can be reduced; and further an operation of the ammonia combustion engine can be realized smoothly with an extremely good efficiency and at a low cost.

Means for Solving the Problems

In order to achieve the aforementioned object, the invention of claim 1 is a method of producing hydrogen from ammonia by which hydrogen supplied as a combustion aid to an ammonia combustion engine that uses ammonia as a fuel is produced from ammonia, including an ammonia decomposition apparatus that decomposes ammonia by action of an ammonia decomposition catalyst so as to produce hydrogen as a combustion aid and nitrogen and an ammonia oxidation apparatus that allows a part of the introduced ammonia to react with oxygen for combustion to generate heat by action of an ammonia oxidation catalyst in order to supply the heat needed for the decomposition reaction to the ammonia decomposition apparatus, wherein ammonia and air introduced into the ammonia oxidation apparatus are heated in advance to 200° C. or higher by heat exchange with a combustion exhaust gas that is discharged from the ammonia combustion engine, and a part of the introduced ammonia is allowed to react with oxygen for combustion by action of the ammonia oxidation catalyst in the ammonia oxidation apparatus, whereby a partly combusted exhaust gas having a temperature raised to 400° C. or higher and containing non-combusted ammonia is introduced into the ammonia decomposition apparatus, and the non-combusted ammonia is decomposed by action of the ammonia decomposition catalyst in the ammonia decomposition apparatus, so as to produce hydrogen as a combustion aid and nitrogen, characterized in that the ammonia decomposition ratio in the ammonia decomposition apparatus is set to be 40 to 60% at all times by controlling the amount of ammonia and the amount of air introduced into the ammonia oxidation apparatus in accordance with an entrance temperature of a layer of the ammonia oxidation catalyst.

Effects of the Invention

The invention of claim 1 is a method of producing hydrogen from ammonia by which hydrogen supplied as a combustion aid to an ammonia combustion engine that uses ammonia as a fuel is produced from ammonia, including an ammonia decomposition apparatus that decomposes ammonia by action of an ammonia decomposition catalyst so as to produce hydrogen as a combustion aid and nitrogen and an ammonia oxidation apparatus that allows a part of the introduced ammonia to react with oxygen for combustion to generate heat by action of an ammonia oxidation catalyst in order to supply the heat needed for the decomposition reaction to the ammonia decomposition apparatus, wherein ammonia and air introduced into the ammonia oxidation apparatus are heated in advance to 200° C. or higher by heat exchange with a combustion exhaust gas that is discharged from the ammonia combustion engine, and a part of the introduced ammonia is allowed to react with oxygen for combustion by action of the ammonia oxidation catalyst in the ammonia oxidation apparatus, whereby a partly combusted exhaust gas having a temperature raised to 400° C. or higher and containing non-combusted ammonia is introduced into the ammonia decomposition apparatus, and the non-combusted ammonia is decomposed by action of the ammonia decomposition catalyst in the ammonia decomposition apparatus, so as to produce hydrogen as a combustion aid and nitrogen, characterized in that the ammonia decomposition ratio in the ammonia decomposition apparatus is set to be 40 to 60% at all times by controlling the amount of ammonia and the amount of air introduced into the ammonia oxidation apparatus in accordance with an entrance temperature of the ammonia oxidation catalyst layer.

According to the invention of claim 1, the filling amount of the ammonia decomposition catalyst in the ammonia decomposition apparatus can be reduced; the efficiency of producing hydrogen can be maintained; the cost of producing hydrogen can be reduced; and further an operation of the ammonia engine can be realized smoothly with an extremely good efficiency and at a low cost.

MODES FOR CARRYING OUT THE INVENTION

Figure 1:
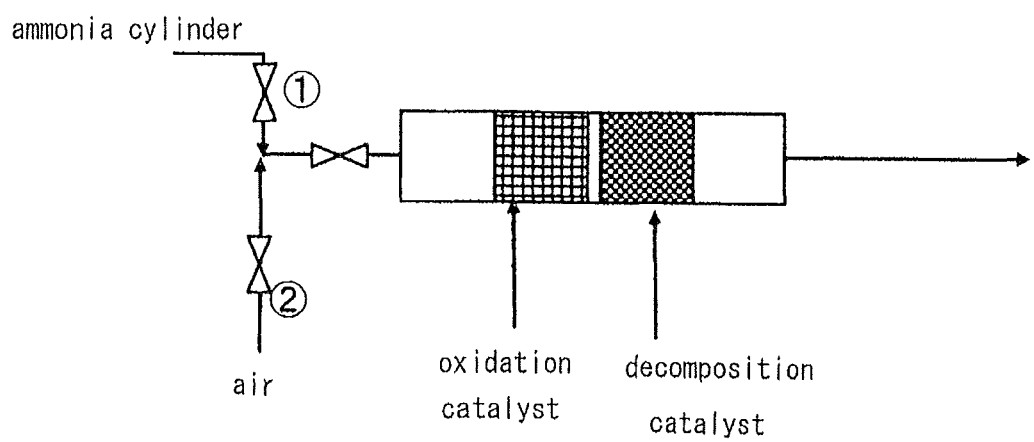
FIG. 1 is a flow sheet of an apparatus that carries out a method of producing hydrogen from ammonia of the present invention.

Next, the embodiments of the present invention will be described; however, the present invention is by no means limited to these alone.

The method of producing hydrogen from ammonia according to the present invention is a method by which hydrogen supplied as a combustion aid to an ammonia combustion engine that uses ammonia as a fuel is produced from ammonia.

The method of producing hydrogen from ammonia according to the present invention includes an ammonia decomposition apparatus that decomposes ammonia by action of an ammonia decomposition catalyst so as to produce hydrogen as a combustion aid and nitrogen and an ammonia oxidation apparatus that allows a part of the introduced ammonia to react with oxygen for combustion to generate heat by action of an ammonia oxidation catalyst in order to supply the heat needed for the decomposition reaction to the ammonia decomposition apparatus.

In other words, in order to produce hydrogen by decomposition of ammonia in the ammonia decomposition apparatus, when a ruthenium ammonia decomposition catalyst is used, for example, ammonia must be brought into contact with these catalyst layers at a temperature of 400° C. or higher. This ammonia decomposition reaction is as follows.

$$2NH_3 \rightarrow N_2 + 3H_2 \quad (1)$$

Since this ammonia decomposition reaction is an endothermic reaction, heat must be supplied from the outside in order to obtain a stable ammonia decomposition ratio.

Therefore, in the present invention, the heat generated by allowing ammonia to react with oxygen (air) for combustion is used as a heat source for supplying heat to the ammonia decomposition catalyst. The ammonia oxidation reaction is as follows.

$$NH_3 + \tfrac{3}{4}O_2 \rightarrow \tfrac{1}{2}N_2 + 3/2H_2O \quad (2)$$

In this manner, in the present invention, a part of the introduced ammonia is allowed to react with oxygen for combustion by action of the ammonia oxidation catalyst in the ammonia oxidation apparatus, and the temperature of the partly combusted exhaust gas containing a non-combusted ammonia is raised to a temperature of 400° C. or higher, preferably 400 to 650° C., by the heat generated by this, and thereafter the partly combusted exhaust gas is introduced into the ammonia decomposition apparatus.

Here, in the present invention, the ammonia and the air introduced into the ammonia oxidation apparatus are preferably heated to 200° C. or higher, more preferably 200° C. or higher and 400° C. or lower, in advance by heat exchange with a combustion exhaust gas that is discharged from the ammonia combustion engine.

Here, with regard to the temperature of the combustion exhaust gas that is discharged from the ammonia combustion engine, the maximum temperature is 700° C. in a good operation circumstance, and the minimum temperature is 250° C. Therefore, the ammonia and the air introduced into the ammonia oxidation apparatus can be heated to 200° C. to 650° C. in advance by heat exchange with the combustion exhaust gas that is discharged from the ammonia combustion engine.

However, the ammonia combustion engine has a poor ignition property of ammonia, so that the combustion of ammonia at the time of low-load operation and at the time of high-load operation of the engine will be insufficient. For example, at an initial operation stage of the engine, the temperature of the combustion exhaust gas that is discharged from the ammonia combustion engine does not reach 400° C. Therefore, in the present invention, the ammonia and the air introduced into the ammonia oxidation apparatus are heated in advance to 200° C. or higher, preferably 200° C. or higher and 400° C. or lower, by heat exchange with the combustion exhaust gas that is discharged from the ammonia combustion engine, and a part of the introduced ammonia is allowed to react with oxygen for combustion by action of the ammonia oxidation catalyst in the ammonia oxidation apparatus, whereby the partly combusted exhaust gas having a temperature raised to 400° C. or higher and containing non-combusted ammonia is introduced into the ammonia decomposition apparatus.

Subsequently, then, the non-combusted ammonia is decomposed by action of the ammonia decomposition catalyst in the ammonia decomposition apparatus, so as to produce hydrogen as a combustion aid and nitrogen.

Here, in the present invention, the ammonia decomposition ratio in the ammonia decomposition apparatus is set to be 40 to 60% at all times by controlling the amount of ammonia and the amount of air introduced into the ammonia oxidation apparatus in accordance with the entrance temperature of the ammonia oxidation catalyst layer.

Here, in the above-described method of the present invention, the ammonia oxidation apparatus can be any one as long as it can lead to the reaction of the above formula (2); however, a platinum-carrying catalyst is suitably used as the ammonia oxidation catalyst.

Further, in this case, the amount of heat generated in the ammonia oxidation apparatus can be controlled by adjusting the flow rate of the ammonia and air gas introduced into the ammonia oxidation apparatus.

Here, the platinum-carrying catalyst may have any shape; however, one having a monolith shape can be used, for example.

Also, in the present invention, the ammonia decomposition apparatus may have any structure; however, one having a structure of a plate-type heat exchanger can be raised as an example. When the ammonia decomposition apparatus has such a structure of a plate-type heat exchanger, the ammonia decomposition catalyst is preferably put to fill the ammonia supply side of this ammonia decomposition apparatus, or alternatively, the surface of the material of the ammonia supply side of this ammonia decomposition apparatus is preferably coated with the catalyst.

The ammonia decomposition catalyst of the ammonia decomposition apparatus may be, for example, a catalyst that carries ruthenium, rhodium, nickel, and/or iron.

According to the above-described method of the present invention, the filling amount of the ammonia decomposition catalyst in the ammonia decomposition apparatus can be reduced; the efficiency of producing hydrogen can be maintained; the cost of producing hydrogen can be reduced; and further an operation of the ammonia engine can be realized smoothly with an extremely good efficiency and at a low cost.

EXAMPLES

Next, concrete effects of the method of producing hydrogen from ammonia according to the present invention have been confirmed by the Examples. Hereafter, description will be given on this point; however the present invention is by no means limited to these Examples.

Example 1

A test of confirming the concrete effects of the present invention was carried out by using an apparatus of FIG. 1 that shows a model view of the apparatus that carries out the method of producing hydrogen from ammonia of the present invention.

First, in the method of producing hydrogen from ammonia of the present invention, the ammonia and the air introduced into the ammonia oxidation apparatus are heated in advance by heat exchange with the combustion exhaust gas that is discharged from the ammonia combustion engine. In this Example, the temperatures of the ammonia and the air were each raised to 200° C. by a heating apparatus not illustrated in the drawings, whereafter the ammonia and the air were introduced into the ammonia oxidation apparatus.

As the ammonia oxidation catalyst of the ammonia oxidation apparatus, a honeycomb-shaped platinum catalyst (one in which a cordierite honeycomb base material is coated with a platinum-carrying $Al_2O_3$ catalyst; amount of carrying platinum: 2 g/L) was used. This platinum-carrying catalyst had a monolith shape, and the filling amount of the catalyst was set to be 2 mL.

Also, the supply amount of ammonia introduced into the ammonia oxidation apparatus was set to be 1.86 ($Nm^3/h$), and the supply amount of air introduced into the ammonia oxidation apparatus was set to be 0.69 ($Nm^3/h$), In this ammonia oxidation apparatus, a part of the introduced ammonia was allowed to react with oxygen (air) by action of the ammonia oxidation catalyst. This oxidation reaction of ammonia is an exothermic reaction, and a partly combusted exhaust gas discharged from the ammonia oxidation apparatus and containing non-combusted ammonia reached about 400° C. by this exothermic reaction. The partly combusted exhaust gas having a temperature raised to about 400° C. in this manner and containing non-combusted ammonia was next introduced into the ammonia decomposition apparatus.

As the ammonia decomposition catalyst in the ammonia decomposition apparatus, a ruthenium catalyst (carrier: activated carbon, a Ba compound was used as a promoter, amount of carrying ruthenium: 5 wt %) having a pellet shape (average diameter of 1 mm) was used.

Then, in this ammonia decomposition apparatus, the non-combusted ammonia was decomposed by action of the ammonia decomposition catalyst, so as to produce hydrogen as a combustion aid in the ammonia combustion engine and nitrogen.

At this time, the ammonia decomposition ratio by the ammonia decomposition catalyst in the ammonia decomposition apparatus was measured with a result of 40%.

Examples 2 and 3

A test was carried out in the same manner as in the above-described Example 1. Though the temperatures of the ammonia and the air introduced into the ammonia oxidation apparatus were each set to be 200° C. and the filling amount of the ammonia oxidation catalyst was set to be 2 mL, the test was carried out by changing each of the supply amount of ammonia, the supply amount of air, and the filling amount of the decomposition catalyst so that the ammonia decomposition ratio in the ammonia decomposition apparatus would eventually be 50% in Example 2 and 60% in Example 3. The obtained results are summarized and shown in the following Table 1. Here, the catalyst filling amount in Table 1 is a sum of the filling amount of the ammonia oxidation catalyst and the filling amount of the ammonia decomposition catalyst, and the filling amount of the ammonia oxidation apparatus was set to have a constant value of 2 mL.

Comparative Example 1

For comparison, a test was carried out by changing each of the supply amount of ammonia, the supply amount of air, and the filling amount of the decomposition catalyst so that the ammonia decomposition ratio in the ammonia decomposition apparatus would be 100%. The obtained results are shown together in the following Table 1.

Figure 2:
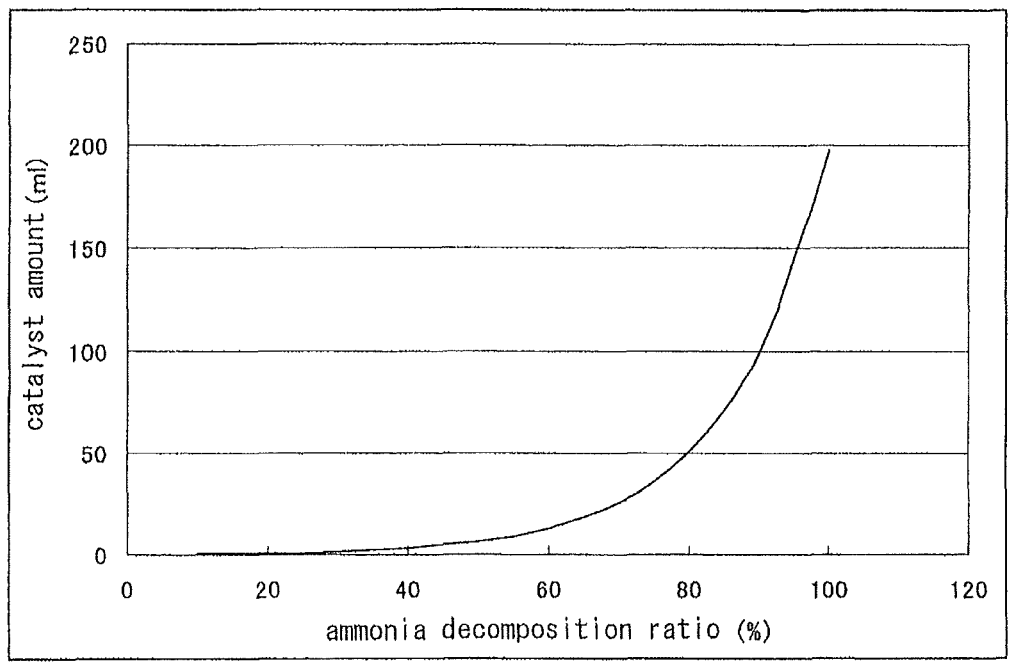
FIG. 2 is a curved line view showing a relationship between a catalyst filling amount and an ammonia decomposition ratio in the ammonia decomposition apparatus.

FIG. 2 is a curved line view showing a relationship between the catalyst filling amount and the ammonia decomposition ratio in the ammonia decomposition apparatus.

Figure 3:
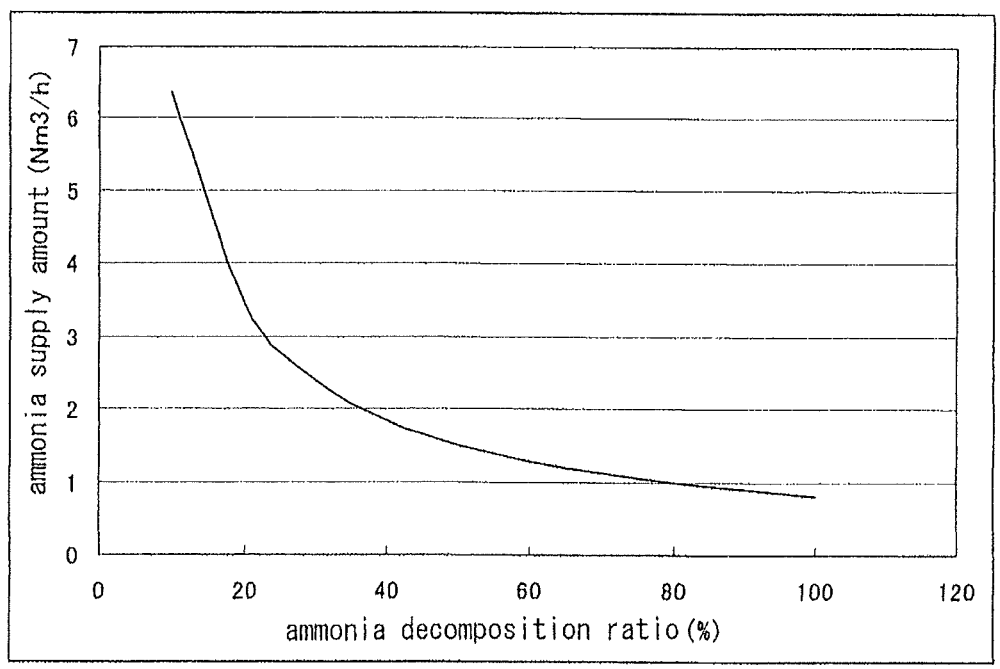
FIG. 3 is a curved line view showing a relationship between an ammonia supply amount and an ammonia decomposition ratio in the ammonia decomposition apparatus.

FIG. 3 is a curved line view showing a relationship between the ammonia supply amount and the ammonia decomposition ratio in the ammonia decomposition apparatus.

With reference to FIG. 2, the catalyst filling amount sharply increases when the ammonia decomposition ratio exceeds 60%. On the other hand, with reference to FIG. 3, when the ammonia decomposition ratio becomes 40% or less, an ammonia supply amount twice as large as that of the case of 100% decomposition ratio is needed, which is not preferable in view of the hydrogen production efficiency.

In this manner, the catalyst filling amount and the hydrogen production efficiency are in what is known as a trade-off relationship. When the ammonia decomposition ratio in the ammonia decomposition apparatus is within a range of 40 to 60%, the filling amount of the ammonia decomposition catalyst can be made small, and also the hydrogen production efficiency will be excellent, so that it is preferable.

Examples 4 to 6 and Comparative Example 2

A test was carried out in the same manner as in the above-described Examples 1 to 3 and Comparative Example 1; however, the temperatures of the ammonia and the air introduced into the ammonia oxidation apparatus were each set to be 350° C. Further, the test was carried out by setting the other points in these Examples 4 to 6 and Comparative Example 2 to be completely the same as those of the above-described Examples 1 to 3 and Comparative Example 1. The test was carried out by changing each of the supply amount of ammonia, the supply amount of air, and the filling amount of the decomposition catalyst so that the ammonia decomposition ratio in the ammonia decomposition apparatus would be 40%, in Example 4, 50%, in Example 5, 60% in Example 6, and 100. % in Comparative Example 2. The obtained results are shown together in the following Table 1.

Examples 7 to 9 and Comparative Example 3

A test was carried out in the same manner as in the above-described Examples 1 to 3 and Comparative Example 1; however, the temperatures of the ammonia and the air introduced into the ammonia oxidation apparatus were each set to be 500° C. Further, the test was carried out by setting the other points in these Examples 7 to 9 and Comparative Example 3 to be completely the same as those of the above-described Examples 1 to 3 and Comparative Example 1. The test was carried out by changing each of the supply amount of ammonia, the supply amount of air, and the filling amount of the decomposition catalyst so that the ammonia decomposition ratio in the ammonia decomposition apparatus would be 40% in Example 7, 50% in Example 8, 60% in Example 9, and 100% in Comparative Example 3. The obtained results are shown together in the following Table 1.

Examples 10 to 12 and Comparative Example 4

A test was carried out in the same manner as in the above-described Examples 1 to 3 and Comparative Example 1; however, the temperatures of the ammonia and the air introduced into the ammonia oxidation apparatus were each set to be 650° C. Further, the test was carried out by setting the other points in these Examples 10 to 12 and Comparative Example 4 to be completely the same as those of the above-described Examples 1 to 3 and Comparative Example 1. The test was carried out by changing each of the supply amount of ammonia, the supply amount of air, and the filling amount of the decomposition catalyst so that the ammonia decomposition ratio in the ammonia decomposition apparatus would be 40% in Example 10, 50% in Example 11, 60% in Example 12, and 100% in Comparative Example 4. The obtained results are shown together in the following Table 1.

TABLE 1

| | Entrance gas temperature ° C. | $NH_3$ decomposition ratio (%) | $NH_3$ supply amount ($Nm^3/h$) | Air supply amount ($Nm^3/h$) | Catalyst filling amount (mL) |
|---|---|---|---|---|---|
| Example 1 | 200 | 40 | 1.86 | 0.69 | 3.3 |
| Example 2 | 200 | 50 | 1.51 | 0.65 | 6.6 |
| Example 3 | 200 | 60 | 1.28 | 0.61 | 13.3 |
| Comparative Example 1 | 200 | 100 | 0.82 | 0.55 | 200.0 |
| Example 4 | 350 | 40 | 1.81 | 0.51 | 3.2 |
| Example 5 | 350 | 50 | 1.47 | 0.49 | 6.4 |
| Example 6 | 350 | 60 | 1.25 | 0.48 | 12.9 |
| Comparative Example 2 | 350 | 100 | 0.79 | 0.46 | 193.6 |
| Example 7 | 500 | 40 | 1.76 | 0.34 | 3.2 |
| Example 8 | 500 | 50 | 1.43 | 0.35 | 6.2 |
| Example 9 | 500 | 60 | 1.21 | 0.36 | 12.6 |
| Comparative Example 3 | 500 | 100 | 0.77 | 0.37 | 187.7 |
| Example 10 | 650 | 40 | 1.72 | 0.18 | 3.0 |
| Example 11 | 650 | 50 | 1.39 | 0.22 | 5.9 |
| Example 12 | 650 | 60 | 1.18 | 0.24 | 11.9 |
| Comparative Example 4 | 650 | 100 | 0.75 | 0.29 | 176.4 |

As will be clear by seeing the results of the above Table 1, it will be understood that, by controlling the amount of ammonia and the amount of air introduced into the ammonia oxidation apparatus in accordance with the entrance temperature of the ammonia oxidation catalyst layer so as to set the ammonia decomposition ratio in the ammonia decomposition apparatus to be 40 to 60% at all times, the filling amount of the ammonia decomposition catalyst in the ammonia decomposition apparatus can be reduced; the efficiency of producing hydrogen can be maintained; the cost of producing hydrogen can be reduced; and further an operation of the ammonia engine can be realized smoothly with an extremely good efficiency and at a low cost.

The invention claimed is:

1. A method of producing hydrogen from ammonia by which hydrogen supplied as a combustion aid to an ammonia combustion engine that uses ammonia as a fuel is produced from ammonia, including an ammonia decomposition apparatus that decomposes ammonia by action of an ammonia decomposition catalyst so as to produce hydrogen as a combustion aid and nitrogen and an ammonia oxidation apparatus that allows a part of the introduced ammonia to react with oxygen for combustion to generate heat by action of an ammonia oxidation catalyst in order to supply the heat needed for the decomposition reaction to the ammonia decomposition apparatus, wherein ammonia and air introduced into the ammonia oxidation apparatus are heated in advance to 200° C. or higher by heat exchange with a combustion exhaust gas that is discharged from the ammonia combustion engine, and a part of the introduced ammonia is allowed to react with oxygen for combustion by action of the ammonia oxidation catalyst in the ammonia oxidation apparatus, whereby a partly combusted exhaust gas having a temperature raised to 400° C. or higher and containing non-combusted ammonia is introduced into the ammonia decomposition apparatus, and the non-combusted ammonia is decomposed by action of the ammonia decomposition catalyst in the ammonia decomposition apparatus, so as to produce hydrogen as a combustion aid and nitrogen, characterized in that an ammonia decomposition ratio in the ammonia decomposition apparatus is set to be 40 to 60% at all times by controlling the amount of ammonia and the amount of air introduced into the ammonia oxidation apparatus in accordance with an entrance temperature of a layer of the ammonia oxidation catalyst.

* * * * *